(12) United States Patent
Hofmann et al.

(10) Patent No.: US 10,107,254 B2
(45) Date of Patent: Oct. 23, 2018

(54) BEARING-ASSEMBLY-AND-SEAL MODULE FOR AN UNDERWATER CURRENT TURBINE OF A TIDAL-/OCEAN-/RIVER-CURRENT POWER PLANT

(71) Applicants: Matthias Hofmann, Schweinfurt (DE); Michael Baumann, Aberdeenshire (GB)

(72) Inventors: Matthias Hofmann, Schweinfurt (DE); Michael Baumann, Aberdeenshire (GB)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/276,836

(22) Filed: Sep. 27, 2016

(65) Prior Publication Data

US 2017/0089319 A1 Mar. 30, 2017

(30) Foreign Application Priority Data

Sep. 28, 2015 (DE) .......... 10 2015 218 628

(51) Int. Cl.
*F03B 13/10* (2006.01)
*F03B 13/26* (2006.01)
(Continued)

(52) U.S. Cl.
CPC .............. *F03B 13/10* (2013.01); *F03B 13/26* (2013.01); *F03B 17/061* (2013.01);
(Continued)

(58) Field of Classification Search
CPC ........ F03B 13/10; F03B 13/26; F03B 17/061; H02K 7/1823; Y02E 10/226
See application file for complete search history.

(56) References Cited

U.S. PATENT DOCUMENTS 2,088,771 A * 8/1937 Smith ............... F03B 3/14
416/168 A
2,267,096 A * 12/1941 Harris ............. F03B 3/128
210/416.1
(Continued)

FOREIGN PATENT DOCUMENTS

DE 102009005556 A1 7/2010
DE 102014204593 A1 4/2015
(Continued)

*Primary Examiner* — Sean Gugger
(74) *Attorney, Agent, or Firm* — Bryan Peckjian; SKF USA Inc. Patent Dept.

(57) ABSTRACT

An underwater current turbine of an underwater tidal-/ocean-/river-flow power plant includes a generator nacelle configured to contain a generator for current generation, a drive unit having at least one rotor blade configured to be driven by moving water and including a shaft connected to the rotor blade for rotation therewith, the shaft extending from the drive unit into the generator nacelle and being configured to drive the generator, and an exchangeable bearing-assembly-and-seal module disposed between the generator nacelle and the drive unit, the bearing-assembly-and-seal module being configured to be removed from the drive unit and from the nacelle as a unit.

11 Claims, 1 Drawing Sheet

(51) Int. Cl.
*F03B 17/06* (2006.01)
*H02K 7/18* (2006.01)

(52) U.S. Cl.
CPC ........ *H02K 7/1823* (2013.01); *F05B 2220/32* (2013.01); *F05B 2220/706* (2013.01); *F05B 2240/50* (2013.01); *F05B 2240/57* (2013.01); *Y02E 10/22* (2013.01); *Y02E 10/226* (2013.01); *Y02E 10/28* (2013.01)

(56) References Cited

U.S. PATENT DOCUMENTS

| | | | | |
|---|---|---|---|---|
| 3,644,053 | A * | 2/1972 | Braikevitch | F03B 13/083 290/52 |
| 4,380,401 | A * | 4/1983 | Chacour | F03B 11/066 384/438 |
| 2004/0094901 | A1 * | 5/2004 | Gittler | F03B 11/006 277/408 |
| 2004/0232704 | A1 | 11/2004 | Casazza et al. | |
| 2005/0023837 | A1 * | 2/2005 | Wobben | F03B 13/10 290/49 |
| 2005/0042101 | A1 | 2/2005 | Hur | |
| 2006/0220389 | A1 | 10/2006 | Shibata et al. | |
| 2007/0041823 | A1 * | 2/2007 | Miller | F03B 17/061 415/4.1 |
| 2007/0075548 | A1 * | 4/2007 | Bagepalli | H02K 15/0006 290/55 |
| 2010/0009799 | A1 * | 1/2010 | Ciszak | F16H 37/0833 475/159 |
| 2010/0052325 | A1 * | 3/2010 | Perner | F03B 11/06 290/52 |
| 2010/0107651 | A1 * | 5/2010 | Hyde | F02C 6/00 60/784 |
| 2010/0276943 | A1 * | 11/2010 | Tianchon | H02K 53/00 290/1 C |
| 2011/0025067 | A1 * | 2/2011 | Cipriani | H02K 7/1823 290/52 |
| 2011/0298293 | A1 * | 12/2011 | Veltri | F16C 39/063 307/84 |
| 2012/0200084 | A1 * | 8/2012 | Blaxland | F03B 13/10 290/43 |
| 2013/0277980 | A1 * | 10/2013 | Kiyose | F03B 3/12 290/54 |
| 2014/0375155 | A1 * | 12/2014 | Kim | H02K 5/10 310/59 |
| 2015/0030277 | A1 * | 1/2015 | Pick | F03D 11/0008 384/558 |
| 2015/0048618 | A1 * | 2/2015 | Inomata | F01D 15/10 290/52 |
| 2015/0125104 | A1 * | 5/2015 | Kullin | F16C 19/545 384/558 |

FOREIGN PATENT DOCUMENTS

| | | |
|---|---|---|
| EP | 2372145 A1 | 10/2011 |
| GB | 2509560 A | 7/2014 |
| WO | 2004007954 A1 | 1/2004 |
| WO | 2012130305 A1 | 10/2012 |

* cited by examiner

BEARING-ASSEMBLY-AND-SEAL MODULE FOR AN UNDERWATER CURRENT TURBINE OF A TIDAL-/OCEAN-/RIVER-CURRENT POWER PLANT

CROSS-REFERENCE

This application claims priority to German patent application no. 10 2015 218 628.8 filed on Sep. 28, 2015, the contents of which are fully incorporated herein by reference.

TECHNOLOGICAL FIELD

The present disclosure relates to a bearing-assembly-and-seal module for an underwater current turbine of a tidal-/ocean-current power plant as well as to an underwater current turbine with such a bearing-assembly-and-seal module.

BACKGROUND

Underwater current turbines are used in tidal or ocean current systems in order to extract power from the marine energy. Such turbines can also similarly be used in rivers. Such underwater current turbines are installed floating or directly on the sea floor/riverbed and have large similarities with wind turbines, however they are still in the development stage. They often have large dimensions and are situated in inaccessible areas. However, standard designs that would reduce the costs for such power plants are not available. Moreover, underwater current turbines can place high demands on the seals to realize an underwater current turbine with connected generator nacelle. Thus conventional underwater turbines, as described, for example, in DE 10 2014 204 593, have methods of construction wherein a shaft driving the generator is enclosed by a sleeve by which in turn the rotor blades are supported in order to minimize water entry. Here the external rotor sleeve is supported against an outer surface of the generator nacelle, which outer surface extends over the main shaft toward the rotor and is separately supported.

However, it is disadvantageous with these underwater current turbines known from the prior art that a variety of separate bearings is required in order to support both the external rotor sleeve and the rotor shaft. In addition, the proposed bearings are subjected to high loads and must additionally endure saltwater entry, which greatly reduces the service life of the bearing. Furthermore it is disadvantageous that an exchange of the bearings is only possible individually and with complete disassembly of the entire underwater current turbine, which is very time and cost intensive.

SUMMARY

An aspect of the present disclosure is therefore to provide an underwater current turbine of an underwater power plant, in particular of a tidal-/ocean-/river-current power plant that has a long service life and is simple to assemble and maintain.

In the following an underwater current turbine of an underwater power plant, in particular of a tidal-/ocean-/river-current power plant is presented with a generator nacelle wherein a generator for electricity generation is disposed. Such underwater current turbines are used in tidal or ocean current systems in order to extract power from marine energy. Such turbines can also similarly be used in rivers. The underwater flow turbines are installed floating or directly on the sea floor/riverbed and have large similarities with wind turbines, with a tower, a nacelle with generator, and a rotor. They often have large dimensions and are situated in inaccessible areas.

The underwater current turbine described in the following furthermore includes a drive unit with at least one rotor blade drivable by water, wherein the drive unit is connected to a shaft such that they rotate together; the shaft extends from the drive unit into the generator nacelle and is configured to drive the generator. In order to provide a particularly simple-to-assemble and rapid-to-maintain underwater current turbine, an exchangeable bearing-assembly-and-seal module is furthermore disposed between generator nacelle and drive unit. In addition to use in a tidal power plant the described turbine can also be used in all other water currents that can drive the rotor blade.

Here the exchangeable bearing-assembly-and-seal module serves in particular to support the shaft and seal the generator nacelle with respect to the water surrounding the turbine. For this purpose the bearing-assembly-and-seal module preferably includes at least one first bearing assembly supporting the shaft and one first seal assembly sealing the bearing-assembly-and-seal module with respect to the shaft. The bearing-assembly-and-seal module, including its bearings, can be removed as a module, that is, as a unit or in one piece, and this makes it easy to install and/or replace.

According to one advantageous exemplary embodiment the bearing-assembly-and-seal module is sealingly attached to the underwater current turbine, in particular to the generator nacelle of the underwater current turbine. In addition to the seal assembly, which provides a sealing between shaft and bearing-assembly-and-seal module, the sealed attaching between bearing-assembly-and-seal module and the housing of the generator nacelle of the underwater current turbine serves to prevent water entry at the interface between the generator nacelle and the bearing-assembly-and-seal module.

According to a further advantageous exemplary embodiment the bearing-assembly-and-seal module is releasably attached to the underwater current turbine, in particular to the generator nacelle of the underwater current turbine. A modular unit can thereby be provided that is easily and quickly exchangeable when needed. At the same time the installation of the underwater current turbine can be effected quickly via the bearing-assembly-and-seal module, so that even under difficult installation conditions, for example, in an offshore installation in bad weather conditions, the turbine can be quickly and easily assembled or serviced.

Furthermore it is preferred if the bearing-assembly-and-seal module includes a module housing that is attached to the underwater current turbine, in particular to the generator nacelle of the underwater current turbine. In addition to the bearing and seal assemblies this module housing can also include other elements, such as, for example, sensors for determining vibrations or temperatures, or also a moisture sensor for determining the tightness of the module housing interior. Using the moisture sensor, on the one hand the state of the seal assembly can be monitored and on the other hand excessive humidity values can be detected. At the same time it is advantageous if the module housing furthermore includes a water drainage system, using which water that has entered into the module housing is dischargeable from the underwater current turbine. Here the water drainage system can cooperate, for example, with the moisture sensor, so that even with a water penetration or a worsening of the seal effect, a water entry into the generator nacelle is preventable.

As a further preferred exemplary embodiment shows, the bearing-assembly-and-seal module itself can be constructed in front of the generator nacelle, however it is also possible that the bearing-assembly-and-seal module is disposed inside the generator nacelle. Here the design of the bearing-assembly-and-seal module outside the generator nacelle offers the advantage that the bearing-assembly-and-seal module is very easy to attach and to exchange. In contrast, if the bearing-assembly-and-seal module is disposed inside the generator nacelle, on the one hand a shortened construction is possible, on the other hand a force flow acting on the bearing-assembly-and-seal module can be diverted better. Furthermore, the internal arrangement has the advantage that the attack surfaces exposed to seawater are reduced so that the service life of the underwater flow turbine can be increased overall.

In order to attach the bearing-assembly-and-seal module to the underwater current turbine, in particular the generator nacelle, the module housing advantageously includes at least one radially extending attachment flange that can preferably be screwed to the generator nacelle. Depending on whether it is designed built-in-front or inside, several such radial attachment flanges can also be provided.

According to a further advantageous exemplary embodiment the module housing of the bearing-assembly-and-seal module furthermore includes an essentially axially extending outer surface on which the at least one bearing assembly is radially inwardly disposed. The at least one seal assembly can also be disposed on the outer surface that is also preferably disposed axially outside the bearing assembly. The bearings of the bearing assembly can thereby be protected from water by the seal assembly.

According to a further advantageous exemplary embodiment the bearing-assembly-and-seal module includes not only one bearing assembly, but two bearing assemblies that preferably support the shaft radially and/or axially. Further bearing assemblies inside the generator housing can thereby be omitted. A bearing-assembly-and-seal module is thereby provided that undertakes the entire shaft supporting and that as a modular component is easily and quickly attachable to the underwater current turbine.

Furthermore it is advantageous if the bearing-assembly-and-seal module includes not only one seal assembly but two seal assemblies that are disposed axially outside the bearing assemblies. Using these seal assemblies, on the one hand the bearing-assembly-and-seal module is protected from an entry of water, and simultaneously with the second seal assembly an entry of water, possibly entering into the module housing, into the generator nacelle is prevented. It can thereby be ensured that the electric components of the generator are secured against water entry, and even with failure of the first seal system.

The seal assembly or the seal assemblies here usually include a plurality of coordinated seals that are adequately known from the prior art.

According to a further advantageous exemplary embodiment the generator furthermore includes a rotor and a stator, wherein the stator is configured such that it rotates with the generator nacelle and the rotor such that it rotates with the shaft. An underwater current turbine can also be provided by this direct driving that is easy to manufacture and to maintain.

A further aspect of the present disclosure relates to an exchangeable bearing-assembly-and-seal module for an underwater current turbine of an underwater power plant, in particular of a tidal-/ocean-/river-current power plant as described above. Here the bearing-assembly-and-seal module preferably includes a module housing that carries at least one bearing assembly and at least one seal assembly, and that is attachable to the underwater current turbine, in particular to a generator nacelle of the underwater current turbine.

Furthermore it is advantageous if the bearing-assembly-and-seal module includes a module housing that is configured as a socket-shaped body that includes at least one radially extending attachment flange with which the attachment on the generator nacelle of the underwater current turbine is made possible.

Furthermore the socket-shaped body can have an outer surface on which the at least one bearing assembly is radially inwardly disposed, and/or on which at least one seal assembly is disposed. Here it is particularly preferred if the seal assembly is disposed axially outside the bearing assembly.

According to a further exemplary embodiment the bearing-assembly-and-seal module respectively includes two bearing assemblies and/or seal assemblies spaced axially from each other, wherein the bearing assemblies are disposed axially inside the seal assemblies.

Furthermore sensors for states of the bearing assembly or seal and/or of the bearing-assembly-and-seal module can be provided on the bearing-assembly-and-seal module, in particular on the module housing. In particular the module housing can include a vibration sensor, a temperature sensor, and/or a moisture sensor that measure the operating states inside the module housing, the bearing assembly, and seal.

It is particularly advantageous here if furthermore a water drainage system is provided on the bearing-assembly-and-seal module that is configured to remove water that has entered into the bearing-assembly-and-seal module from the bearing-assembly-and-seal module.

Further advantages and advantageous designs are defined in the description, the claims, or the drawings. Here in particular the combinations of features specified in the description and in the drawings are purely exemplary, so that the features can also be present individually or combined in other ways.

In the following the disclosure shall be described in more detail with reference to the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
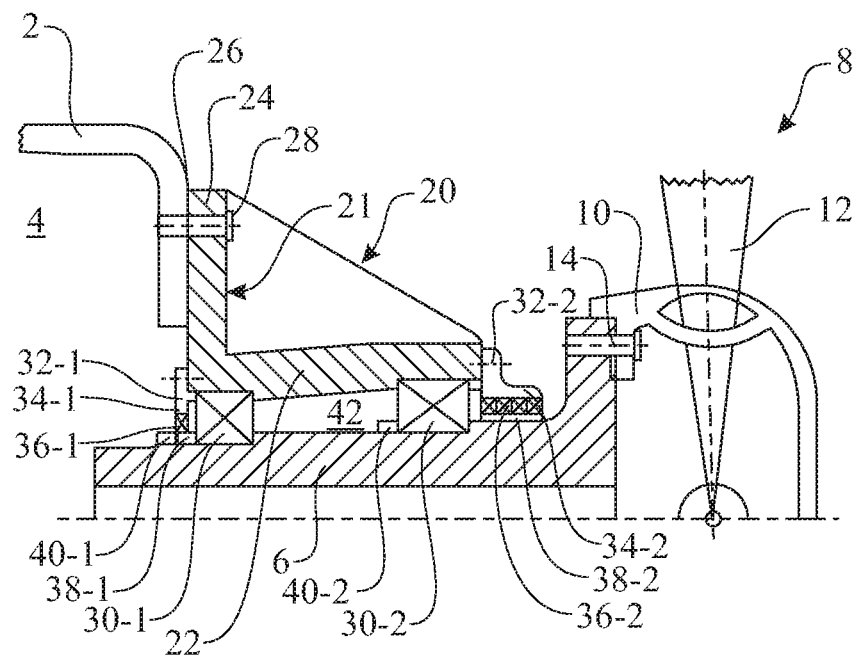
FIG. 1 shows a first preferred exemplary embodiment of an underwater current turbine.
Figure 2:
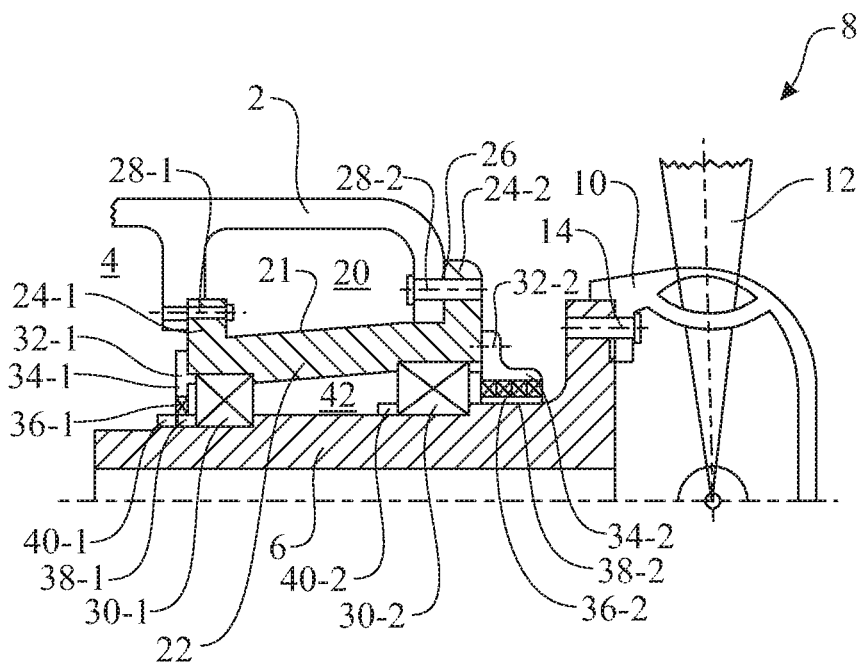
FIG. 2 shows a second preferred exemplary embodiment of an underwater current turbine.

FIGS. 1 and 2 schematically show a sectional view through a part of an underwater current turbine 1 with a generator nacelle 2, in whose interior 4 an electric generator (not depicted) is received that as known generates current using a rotor and a stator. Such underwater current turbines are used in tidal- or ocean-current systems in order to extract power from the marine energy. Such turbines can also similarly be used in rivers. The underwater current turbines are installed floating or directly on the sea floor/riverbed and have large similarities with wind turbines. For driving the generator the generator rotor is connected to a drive unit 8 via a shaft 6. The drive unit 8 in turn includes a rotor blade carrier 10, to which rotor blades 12 are attached. The rotor blade carrier 10 is in turned connected via attachment means 14, such as a screw or a bolt, to the shaft 6 such that the rotor blade carrier 10 and the shaft 6 rotate together.

In underwater current turbines the drive unit 8 is usually driven via water currents, caused, for example, by tidal currents, river currents, or ocean currents. This means at the same time that although the drive unit 8 is exposed to the water, the interior 4 of the generator nacelle 2 must be sealed with respect to the surrounding water in order for the rotor and stator of the generator therein to operate.

In order to provide this sealing between drive unit 8 and generator nacelle 2, the underwater current turbine 1 shown in the Figures furthermore includes a bearing-assembly-and-seal module 20 with a module housing 21. As FIG. 1 shows, the bearing-assembly-and-seal module 20 can be disposed in front of the generator nacelle 2, i.e., between generator nacelle 2 and drive unit 8; however it is also possible, as depicted in FIG. 2, that the bearing-assembly-and-seal module 20 is disposed inside the generator nacelle 2.

In the exemplary embodiments shown the module housing 21 of the bearing-assembly-and-seal module 20 is itself configured essentially socket-shaped and includes an outer surface 22 that extends essentially axially toward the shaft 6. Furthermore, in the case of the outer-lying solution depicted in FIG. 1, the bearing-assembly-and-seal module 20 includes a radially extending attachment flange 24 and, in the case of the inner lying solution, two radially extending attachment flanges 24-1 and 24-2, with which the bearing-assembly-and-seal module 20 is attachable to the generator nacelle 2. For this purpose a seal 26 is inserted between generator nacelle 2 and attachment flange 24, and then the generator nacelle and the attachment flange 24 are screwed to each other via also-sealed attachment means, in particular screws 8. Here as FIG. 1 depicts, the screws 8 can be accessible from outside, however it is also possible, as depicted in FIG. 2, that the screws 28 are accessible from inside. As mentioned above, in addition to the schematically depicted seals 26 still further seal elements can be provided between the generator nacelle 2 and the attachment flange 24 in the region of the screws 28, which further seal elements prevent a water entry into the interior 4 of the generator nacelle 2. The accessibility of the attachment means 28-1, 28-2 in the embodiment depicted in FIG. 2 is provided, for example, via a manhole available in the generator nacelle 2.

The bearing-assembly-and-seal module 20 furthermore carries, preferably on its axial outer surface 22, at least one, but in the cases shown two, bearing assemblies 30-1 and 30-2 that provide an axial and radial supporting of the shaft 6. The bearing assemblies usually used for the radial and/or axial supporting of the shaft are known to the person skilled in the art. Here all bearing assemblies of the bearing-assembly-and-seal module can be equally supported.

Furthermore at least one, but in the cases shown two, seal assemblies 32-1, 32-2 are provided on the bearing-assembly-and-seal module 20, which seal assemblies 32-1, 32-2 are preferably disposed axially outside the bearing assemblies 30. These seal assemblies 32 ensure that the water surrounding the underwater current turbine 1 along the shaft 6 cannot enter into the interior 42 of the module housing 21 and further in the interior 4 of the generator nacelle 2. Here the seal assemblies 32 comprise, for example, a carrier 34, a seal system 36, and a contact metal plate or a contact socket 38. These components of the seal assembly are only schematically depicted. Thus the seal system 36 usually comprises a plurality of differently designed seals that are known from the prior art.

In order to secure the axial positions both of the seal assembly 32 and of the bearing assemblies 30, clamping rings 40 can furthermore be provided that are disposed either directly on the bearing assembly 30 or on the seal assembly 32 (see 40-2).

The bearing assemblies 30 used for the supporting of the shaft, or the seal assembly 32 used for the sealing of the shaft, are adequately known from the prior art. However, it is different from the prior art that the bearing assemblies 30 and seal assemblies 32 are attached to the module housing 21 of the bearing-assembly-and-seal module 20 and are available with the bearing-assembly-and-seal module 20 as a complete assembly set. An exchange of the bearing assemblies or seal assemblies on the underwater current turbine 1 can therefore be made possible in a quick and simple manner. Furthermore, already preloaded bearing assemblies 30 can be carried by the bearing-assembly-and-seal module 20 so that a preloading need not occur only at the operation site. Furthermore, such bearing-assembly-and-seal modules 20 can be provided as unit components that can be delivered to the customer as a complete replacement part. In particular with the arrangement depicted in FIG. 2, wherein the bearing-assembly-and-seal module is disposed inside the generator nacelle 2, maintenance work can furthermore be made possible directly out from the interior 4 of the generator nacelle 2 by existing maintenance openings.

Furthermore it is advantageous that in addition to the seals 32 and the bearing assemblies 30, the bearing-assembly-and-seal module 20 can include sensors (not depicted) for determining the physical states inside the bearing and/or seal assemblies, such as, for example, of temperature or vibration, with which the bearing states can be monitored directly. Furthermore one or more moisture sensors can be provided on the bearing-assembly-and-seal module that measure a wear of the seal assembly 32 or generally the degree of liquid and moisture in the bearing-assembly-and-seal module 20. Here it is preferred in particular if the moisture sensors simultaneously cooperate with a water drainage system that removes possibly penetrated water from the interior 42 of the bearing-assembly-and-seal module 20. These additional sensors can also be directly attached as a standard assembly set to the bearing-assembly-and-seal module 20 and delivered with this as a complete assembly set. Depending on the particular conditions the seal assemblies 32 or bearing assemblies 30 can be adapted to the particular circumstances. Thus, for example, different bearing assemblies or seals can be carried by the same bearing-assembly-and-seal module housings 20. This simultaneously means that an individualization to different requirements is possible without problems. Thus, for example, other seal systems 32 can be used for use in freshwater than with use in saltwater. Furthermore, the seal systems can be designed according to the pressures to be expected. Thus it is possible, for example, to use a lip-seal system with low expected pressures, while with high pressures mechanical seal systems can also be used.

Overall with the above-described bearing-assembly-and-seal module an easily exchangeable component for an underwater current turbine can be provided that provides both a supporting and a sealing of the shaft connecting the generator to a drive unit. This module makes possible an easy and fast installing or maintenance with simultaneous optimal sealing and supporting of the shaft so that even with difficult-to-access locations an installation and/or maintenance of the underwater current turbine can be carried out on site without problems. For maintenance work only the generator nacelle together with the drive unit must be brought to the water surface, where a separation of the generator nacelle and the drive unit is then effected by separating the bearing-assembly-and-seal module together with the drive shaft at the interface of the generator nacelle and bearing-assembly-and-seal module. The entire module can subsequently be removed from the shaft without problems. Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing and seal assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Underwater current turbine
2 Generator nacelle
4 Interior of the generator nacelle
6 Shaft
8 Drive unit
10 Rotor-blade carrier
12 Rotor blade
14 Attachment means
20 Bearing-assembly-and-seal module
21 Module housing
22 Axial outer surface
24 Radial attachment flange
26 Seal
28 Attachment means
30 Bearing assembly
32 Seal assembly
34 Seal carrier
36 Seal system
38 Contact socket
40 Clamping ring
42 Module housing interior

What is claimed is:

1. An underwater current turbine of an underwater tidal-/ocean-/river-flow power plant comprising:
   a generator nacelle configured to contain a generator for current generation,
   a drive unit having at least one rotor blade configured to be driven by moving water and including a shaft connected to the rotor blade for rotation therewith, the shaft extending into the generator nacelle and being configured to drive the generator; and
   an exchangeable bearing-assembly-and-seal module exchangeably disposed between the generator nacelle and the drive unit, the bearing-assembly-and-seal module having an axis of rotation,
   wherein a first portion of a module housing of the exchangeable bearing-assembly-and-seal module is releasably assembled directly to and removable from the generator nacelle by rotationally engaging mechanical fasteners and a second portion of the module housing of the exchangeable bearing-assembly-and-seal module is rotationally assembled directly to the shaft by at least one bearing assembly,
   wherein a seal module of the bearing-assembly-and-seal assembly includes a first seal assembly, and a second seal assembly axially spaced from the first seal assembly;
   wherein the first seal assembly and the second seal assembly are attached to the module housing,
   wherein the seal module of the exchangeable bearing-assembly-and-seal module provides a watertight seal between the shaft and the module housing of the exchangeable bearing-assembly-and-seal module, the seal module ensuring that water surrounding the underwater current turbine along the shaft cannot enter into an interior of the module housing and further in an interior of the generator nacelle,
   wherein the bearing-assembly-and-seal module is configured to be removable from the drive unit and from the nacelle in one piece.

2. The underwater current turbine according to claim 1, wherein the bearing-assembly-and-seal module is sealingly attached to the generator nacelle.

3. The underwater current turbine according to claim 1, wherein the bearing-assembly-and-seal module includes the at least one bearing assembly supporting the shaft and at least one seal assembly sealing the bearing-assembly-and-seal module with respect to the shaft.

4. The underwater current turbine according to claim 1, wherein the module housing includes at least one radially extending attachment flange attached to the generator nacelle.

5. The underwater current turbine according to claim 1, wherein the module housing includes a substantially axially extending outer surface, on which the at least one bearing assembly is radially inwardly disposed, and on which at least one seal assembly is disposed.

6. The underwater current turbine according to claim 1, wherein a water-drainage device is provided in the module housing, the water drainage device being configured to detect water in the module housing and/or to discharge water from the module housing.

7. The underwater current turbine according to claim 1, wherein the at least one bearing assembly comprising a first bearing assembly and a second bearing assembly, wherein the bearing assembly-and-seal module includes the first bearing assembly and the second bearing assembly, the second bearing assembly axially spaced from the first bearing assembly, the first bearing assembly and the second bearing assembly being located axially between the first seal assembly and the second seal assembly.

8. The underwater current turbine according to claim 1, wherein the generator includes a rotor and a stator, wherein the stator is configured to rotate together with the generator nacelle and the rotor is configured to rotate together with the shaft.

9. The underwater current turbine according to claim 1, wherein the at least one bearing assembly comprising a first bearing assembly and a second bearing assembly, wherein the bearing-assembly-and-seal module includes the module housing having at least one flange that is releasably and sealingly attached to the generator nacelle, and
wherein the bearing-assembly-and-seal module includes the first bearing assembly and the second bearing assembly, wherein the second bearing assembly is axially spaced from the first bearing assembly, the first bearing assembly and the second bearing assembly being located axially between the first seal assembly and the second seal assembly.

10. The underwater current turbine according to claim 1, wherein the seal module of the exchangeable bearing-assembly-and-seal module is disposed axially outside the at least one bearing assembly.

11. An exchangeable bearing-assembly-and-seal module configured to be mounted between a generator nacelle and a drive unit of an underwater current turbine of an underwater tidal-/ocean-/river-flow power plant, the bearing-assembly-and-seal module including:
a first seal assembly;
a second seal assembly axially spaced from the first seal assembly;
a first bearing assembly; and
a second bearing assembly axially spaced from the first bearing assembly,
a module housing comprising a flange provided for detachable assembly directly to a nacelle,
the first bearing assembly and the second bearing assembly being located axially between the first seal assembly and the second seal assembly,
wherein the first bearing assembly and the second bearing assembly are attached to a radially interior portion of the module housing,
wherein the first seal assembly and the second seal assembly are attached to the module housing,
wherein the bearing-assembly-and-seal module is configured to be removable from the drive unit and from the nacelle as a unit.

* * * * *